United States Patent [19]

Christiansen

[11] 4,384,427

[45] May 24, 1983

[54] ARRANGEMENT IN AN AUTOMATIC ANGLING MACHINE

[76] Inventor: Thorbjørn N. Christiansen, Vesterålsgt. 1, 8400 Sortland, Norway

[21] Appl. No.: 193,975

[22] Filed: Oct. 6, 1980

[30] Foreign Application Priority Data

Oct. 9, 1979 [NO] Norway .................................. 793236

[51] Int. Cl.³ ............................................ A01K 89/017
[52] U.S. Cl. ............................................ 43/26.1; 43/4; 242/84.1 A
[58] Field of Search ...................... 43/26.1, 15, 4, 21, 43/27.4, 6.5; 254/270, 271; 242/84.1 A, 106, 36, 49; 33/126.6; 200/61.18

[56] References Cited

U.S. PATENT DOCUMENTS

| | | | |
|---|---|---|---|
| 2,735,207 | 2/1956 | Christiansen | 43/15 |
| 3,148,814 | 9/1964 | Studer | 242/36 X |
| 3,633,835 | 1/1972 | Beers | 242/36 |
| 3,845,323 | 10/1974 | Bellasio | 200/61.18 X |
| 3,916,555 | 11/1975 | Booth et al. | 43/27.4 |

Primary Examiner—Nicholas P. Godici
Assistant Examiner—Charles L. Willis

[57] ABSTRACT

An automatic angling machine of the type comprising a line reel, a circuit associated therewith for delivery of pulses in dependence of the rotational speed of the reel, a counter means for recording the fishing line depth, an electromagnetic clutch and an automatic depth control circuit which, in cooperation with the counter means, controls the various functions of the machine by means of the clutch. According to the invention, there is provided a means for activating the automatic depth control circuits and therewith the clutch in order to stop the line reel when the fishing line becomes slack during discharge from the line reel. The means comprises an electric circuit which is connected between the pulse-delivering circuit and the automatic depth control circuits and is adapted to deliver an activating signal when the frequency of said pulses becomes lower than a given value.

2 Claims, 4 Drawing Figures

ARRANGEMENT IN AN AUTOMATIC ANGLING MACHINE

The present invention relates to an arrangement in an electronically controlled angling machine comprising a line reel and a circuit associated therewith for delivery of pulses of a frequency determined by the rotational speed of the reel, a counter means for recording the fishing line depth by counting of said pulses, an electromagnetic clutch and automatic depth control circuits cooperating with said counter means and providing for control of the various functions of the machine by means of said clutch, and a means for activating the automatic depth control circuits in response to the ceasing of the out-going movement of the fishing line.

From the Applicant's prior U.S. patent application Ser. No. 56,063 filed July 9, 1979, there is known a fully automatic angling machine of the above mentioned type wherein there is provided a means for activating of the automatic depth control circuits and thereby the clutch of the machine for connection of e.g. the braking function if and when the fishing line becomes slack during discharge (letting-out) from the line reel. The known device comprises a magnetic switch and a switch operating member in the form of a rocker arm which is mounted as a double-armed lever, the free end of one arm constituting a loop placed over the fishing line between the reel and a roller or the like placed at a distance from the reel, and the free end of the other arm being arranged to actuate said switch when the loop end falls down when the line is slack.

Even if this device normally functions in the intended manner, its mechanical principle is encumbered with certain drawbacks, as the device may cause unintended connection of the automatic depth control, e.g. when the boat rolls in heavy sea.

Thus, the object of the present invention is to provide an automatic depth control activating means which is free from mechanically movable parts and which provides for said activation only as a result of a substantial reduction of the rotational speed of the line reel.

According to the invention the above mentioned object is achieved in that the activating means comprises a circuit connected between said pulse-delivering circuit and said automatic depth control circuit and adapted to deliver an activating signal when the frequency of said pulses becomes lower than a given value.

The invention will be described more closely in the following in connection with an exemplary embodiment with reference to the accompanying drawings, wherein.

Figure 1:
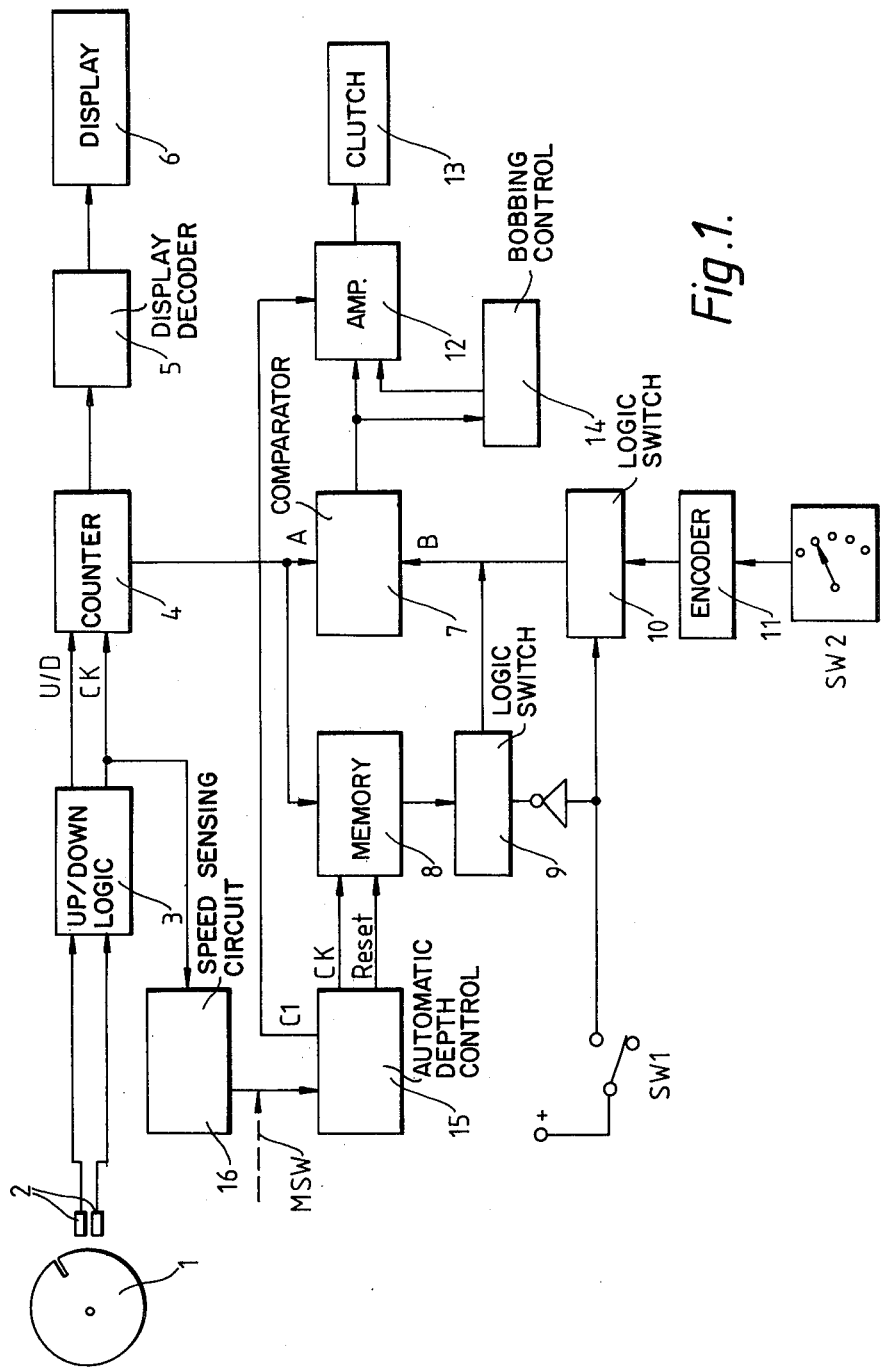
FIG. 1 shows a block diagram of electronic circuits forming part of a fully automatic angling machine of the type in question, and comprising a circuit means according to the invention.

Such as schematically shown in FIG. 1, a pair of switches 2 in the form of inductive proximity switches are arranged in association with the line reel 1 of the angling machine, each of said switches delivering a signal for each revolution of the line reel or winder. The switches are somewhat displaced in relation to each other, and in this way it is sensed in which way the winder is rotating (line moving up or down). The signals from the switches 2 are supplied to and processed in an up/down logic circuit 3, and from this circuit there are delivered an up-down signal and a clock signal which are supplied to respective inputs U/D and CK of a counter means 4 which thereby records the fishing line depth, i.e. the depth of the fishing tackle in the sea. In practice the counter means may comprise three BCD up/down counters, i.e. counters indicating their count in binary coded decimal format. For a closer description of the up/down logic and the counter means, and also remaining circuit elements forming part of such an angling machine, reference is also made to the Applicant's copending U.S. patent application Ser. No. 8,810, filed on Feb. 2, 1979, now U.S. Pat. No. 4,253,165.

The BCD-code of the counter means 4 is supplied to a decoder 5 converting the BCD code to 7-segment code, and these code signals are supplied to a display device 6 with indicators showing the setting of the counter means. Moreover, the BCD code is supplied to a comparator 7 and to a memory 8 which will be more closely described below.

Before the automatic depth control circuits and the device according to the invention is further described, it will be described—for the sake of the survey—how the machine functions with manual setting of the fishing depth.

To place the device in the manual mode, a switch SW1 is set or positioned so that a tri-state logic circuit 9 receives a signal on its disable input. This circuit is thus inoperative (high impedance on the input), whereas another tri-state circuit 10 is operative. Thereafter the fishing depth is set on e.g. 75 by means of a switch SW2. In practice there is one switch for each digit place in the number indicating the depth, i.e. three switches for indication of a three-digit number. The switch setting is supplied to a coder 11 delivering an output signal in BCD code, so that the set number "75" is supplied in BCD code via the tri-state circuit 10 to the B input of the comparator 7. Thereafter an actuating switch (not shown) is depressed and the reel or winder 1 starts going out. When the winder has "gone out" 75 revolutions, the number 75 (in BCD code) stands on the A input of the comparator 7. The A and B inputs of the comparator now have the same value and the comparator then delivers an output signal which is supplied to an amplifier 12 and after amplification is supplied to the clutch 13 of the machine. The clutch is thereby activated and connects, and the rotational direction of the winder is reversed so that the line is pulled up. Simultaneously the "bobbing" function circuit 14 (monostable multivibrator) of the machine receives a signal from the comparator, so that it supplies current to the clutch 13 when the signal from the comparator fails to appear, and this happens as soon as the A input of the comparator becomes lower than the B input as the line starts to be pulled up. The time during which the "bobbing" function is connected, determines the bobbing length (jigging length). The line is now pulled up until the bobbing function is finished. The sinker at the end of the fishing line then goes out once more, and the process is repeated.

Figure 2:
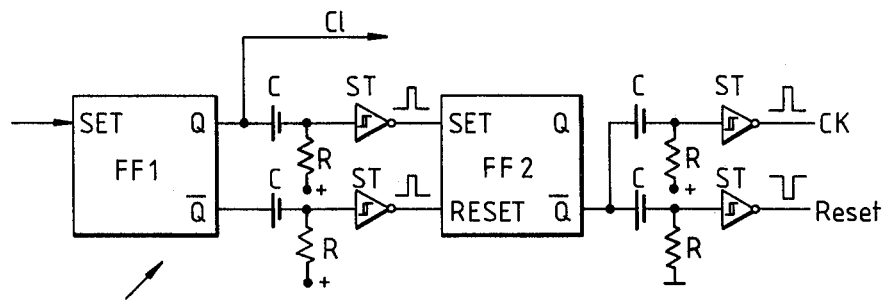
FIG. 2 shows a circuit diagram of the automatic depth control circuits of the machine.

When the switch SW1 is in the position shown in FIG. 1, the device is in the automatic bottom fishing mode. The automatic depth control circuit 15 of the machine is shown in more detail in FIG. 2 and its operation will now be described. This circuit has an output line C1 which is connected to the clutch 13 and which, by activation of the automatic depth control, delivers a signal energizing the clutch to pull up the line. Such as initially stated, the activating signal to the automatic depth control was produced in prior art devices by means of a magnet switch when the associated rocker arm fell down in case of slack line. This signal was supplied to the automatic depth control by the suggested dashed line MSW in FIG. 1. On the other hand, with the device according to the invention, the activating signal is provided by means of an activating circuit sensing or recording that the rotational speed of the reel or winder decreases beyond a certain limit. An embodiment of this circuit 16, which is connected between the up/down logic and the automatic depth control, and which records that the pulses from the winder cease, is to be more closely described in connection with FIGS. 3 and 4. Firstly, however, a closer description will be given of the automatic depth control circuit according to FIG. 2.

The signal which is provided when the winder stops, is supplied to the SET input of a first flip-flop FF1, so that the output Q of the flip-flop becomes "1" and the output Q becomes "0". The flip-flop FF1 remains set for approximately 2.5 seconds which is the time it takes to pull up the line a suitable length after that the outgoing movement of the line has stopped when the sinker has reached the bottom. Via the output line C1 the output Q of the flip-flop supplies current to the clutch 13 so that this is activated to pull up the line. The illustrated RC filters on the input of the Schmidt-triggers ST cause short, positive pulses on the outputs of the triggers each time a "0" is present at the respective FF1 output.

At the same moment as the flip-flop FF1 connects and Q becomes "0", a short positive pulse is obtained on the Reset input to a second flip-flop FF2. After approximately 2.5 seconds the flip-flop FF1 is switched back, and a pulse is obtained on the SET input of the second flip-flop FF2. The flip-flop FF2 then connects and a pulse is obtained on the output CK of the automatic depth control circuit. This is a pulse causing the count value of the counter means 4 to be introduced into the memory 8 (FIG. 1). The value of the counter now stands on the B side of the comparator 7, and this is then the fishing depth used in automatic bottom fishing mode. After the expiration of a time interval corresponding to the switching time of the flip-flop FF2 (which may be set on the front panel of the machine (not shown)) the flip-flop switches back and a negative pulse is delivered on the Reset output of the automatic depth control circuit (Reset is active low). The content in the memory 8 is then erased. The memory is arranged so that all outputs become "1" by resetting. As it is the question of 3-digit numbers in BCD code, there will be totally twelve outputs. When all outputs are "1", the number becomes equal to "999" (decimal code) and the sinker once more falls to the bottom and the whole process is repeated.

If the boat is drifting and the depth becomes smaller, the sinker may reach the bottom before the expiration of said time interval. One receives then at once a signal to pull the line up from the bottom, and a new fishing depth is set.

The functions of the automatic depth control may be summed up as follows:
1. When the bottom is reached, it shall provide for pulling up the line a suitable length from the bottom) approximately 1 meter).
2. Keep the line above said depth while the machine is fishing (by activating the bobbing function to cause jigging movements as described in the manual mode).
3. Let the line down to the bottom again after a certain time to control the depth.
4. If the depth becomes smaller and the sinker reaches the bottom before the time interval has elapsed, it shall provide for pulling up the line from the bottom and introduce a new fishing depth.

Figure 3:
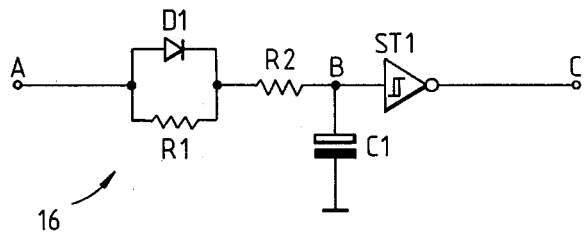
FIG. 3 shows a circuit diagram of an embodiment of the means according to the invention.
Figure 4:
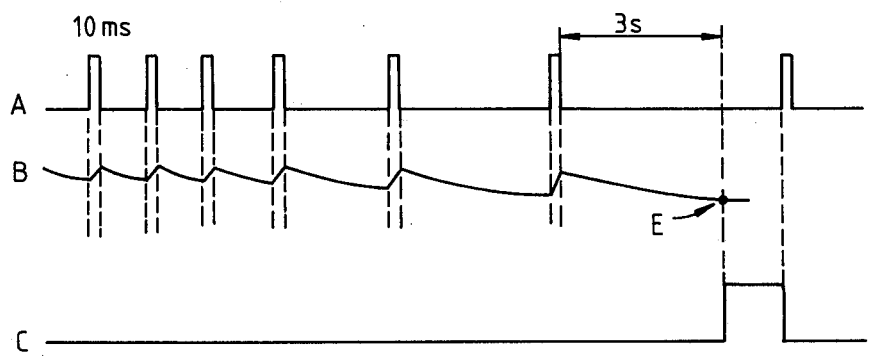
FIG. 4 shows occurring wave-forms in three different points in the circuit of FIG. 3.

As previously mentioned, the pulses from the winder 1 which are available in the system, are used in the device of FIG. 3 for connecting the automatic depth-function circuit. The pulses are supplied in point A in FIG. 3, and a pulse train occuring by decreasing rotational speed of the winder is shown at A in FIG. 4. The shown activating circuit comprises a Schmidt trigger ST1 and an RC-link arranged on the input thereof and consisting of a capacitor C1 and a resistance path containing a first resistor R2 and a parallel connection of a second resistor R1 and a diode D1 connected in series with the first resistor. Because of the diode the RC-link has a larger time constant one way than the other, and in this way one achieves an extended pulse length on the input B of the Schmidt trigger. The voltage course of the input is shown at B in FIG. 4. When the voltage on the input, i.e. the voltage across the capacitor C1, sinks below a certain level, a switching of the Schmidt trigger ST1 takes place, so that the output C becomes "high" and delivers an activating signal to the automatic depth control. This switching occurs in the point E in FIG. 4, i.e. after a discharge time of approximately 3 seconds, such as appears from FIG. 4. This possibly adjustable time interval is substantially longer than the duration of a revolution of the winder at usual speed, and therefore no change is obtained on the output C before the speed of the winder has become so low that the revolution time in this case becomes larger than 3 second.

When the line sinker reaches the bottom and the winder stops, there is thus received a signal for activation of the automatic depth control when the frequency of the pulses from the winder decreases below a given value. The same is the case if the downwards movement of the sinker is stopped by fish and the speed of the winder for this reason decreases in a sufficient degree.

I claim:
1. An electronically controlled angling machine comprising:
   a line reel;
   a fishing line wound around said reel;
   a pulsing circuit coupled to said reel for generating a series of pulses the frequency of which is proportional to the speed of rotation of said reel;
   a counter means coupled to said pulsing circuit for determining the depth of an end of said fishing line by counting the pulses in said series;
   an electromagnetic clutch coupled to said line reel for controlling movement of said fishing line;
   a speed sensing circuit for generating a bottom contact signal when the frequency of said pulses falls below a predetermined frequency; and
   an automatic depth control circuit for controlling the operation of said clutch to cause the movement of said one end of said fishing line according to a predetermined movement pattern in response to a bottom contact signal from said speed sensing circuit, wherein said speed sensing circuit includes a Schmidt-trigger and a resistor-capacitor low pass filter network in series between said pulsing circuit and the input of said Schmidt-trigger, said Schmidt-trigger generating the bottom contact signal when the voltage across the capacitor of the resistor-capacitor network falls below a predetermined valve.

2. The angling machine as claimed in claim 1, wherein the resistance path of said resistor-capacitor network comprises a first resistor and a parallel connection of a second resistor and a diode connected in series with said first resistor.

* * * * *